Nov. 9, 1965 D. C. GOTTLIEB ETAL 3,217,225
BATTERY CHARGER WITH TIMING MEANS, CURRENT
REGULATION, INDICATING MEANS, POLARITY
CONTROL AND BATTERY TERMINAL
VOLTAGE ADAPTION
Filed Aug. 30, 1960
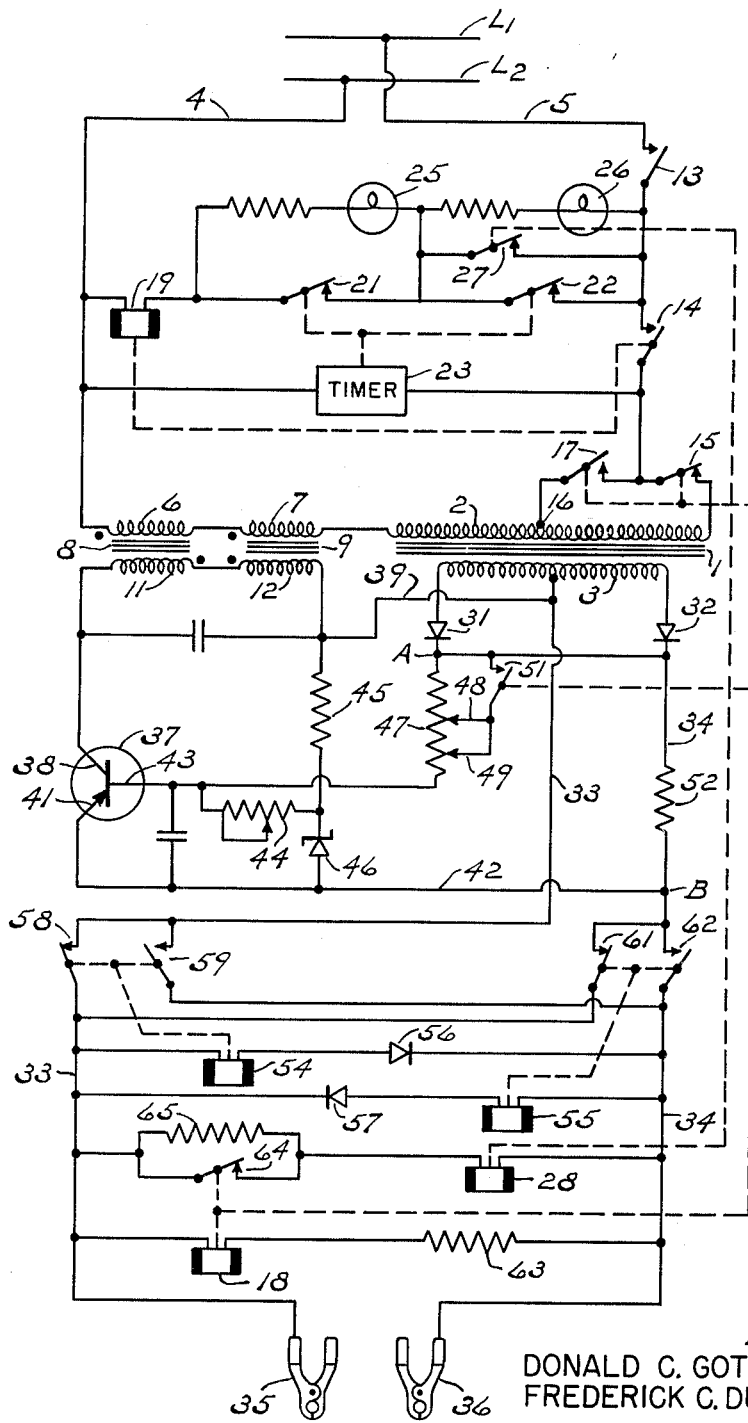
INVENTORS
DONALD C. GOTTLIEB
FREDERICK C. DUNCANSON United States Patent Office 3,217,225
Patented Nov. 9, 1965

3,217,225
BATTERY CHARGER WITH TIMING MEANS, CURRENT REGULATION, INDICATING MEANS, POLARITY CONTROL AND BATTERY TERMINAL VOLTAGE ADAPTION
Donald C. Gottlieb, Leominster, and Frederick C. Duncanson, Clinton, Mass., assignors to The Electric Storage Battery Company, a corporation of New Jersey
Filed Aug. 30, 1960, Ser. No. 52,945
3 Claims. (Cl. 320—37)

The present invention generally relates to storage battery charging circuits. More specifically, the present invention is concerned with an automatically timed battery charging circuit.

A general object of the present invention is to provide an automatically timed battery charger adapted to charge a storage battery at a constant rate of current irrespective of change in the A.C. supply voltage and changes in the battery voltage during the charging period.

Another object of the present invention is to provide a new and improved battery charger adapted to charge a battery at a constant rate for a minimum period of time but not more than a maximum period of time and at the termination of the charging period provide an indication that the battery has either attained the desired state of charge or that a test is required to determine the possibility of trouble.

Inasmuch as automotive type storage batteries in use today are generally either of the 6-volt or 12-volt type, it is a further object of the present invention to provide a battery charger adapted to be connected to battery terminals by suitable connectors, the construction being such that the operator need give no attention to either the battery terminal voltage or to the polarity of the battery terminals.

In accordance with the present invention there is provided a battery charger which is adapted under the control of a timer to charge a battery at a constant current rate for a predetermined minimum period of time. At the expiration of this minimum time period, the charger is adapted to automatically stop charging if the battery being charged has attained a full state of charge during the minimum charging period. If the battery being charged has not attained the full state of charge during the minimum time period, the unit is adapted to continue charging the battery until the battery has achieved a satisfactory state of charge. If the battery voltage does not rise to a point indicating a full state of charge, the charge will be automatically terminated at the expiration of a maximum charging period. If the charge is terminated by the battery obtaining a full state of charge, a visual indication is provided that the charge is complete. However, if the charge is terminated by the expiration of the maximum charging period, a visual indication is provided that the battery has not attained a full state of charge during that period thereby indicating that the battery should be tested to determine if it is defective. To provide for constant current battery charging, the charger of the present invention utilizes a transistor circuit responsive to charging current and battery voltage to vary the saturation of a pair of saturable reactors controlling the alternating current supplied to the charger rectifier circuit. Polarized relay circuits are provided to automatically adapt the charging current rate and charger control circuit to battery terminal voltage and battery polarity.

A better understanding of the present invention may be had from the following description when read with reference to the accompanying drawings which is a schematic circuit diagram of a battery charger in accordance with the present invention.

Referring now to the drawing, control of the battery charger of the present invention is effected by controlling the A.C. energization of the main power transformer 1 having a primary winding 2 and a secondary winding 3. To this end, the primary winding 2 of the transformer 1 is connected across the suitable source of alternating current, shown here as conductors $L_1$ and $L_2$, by means of the conductors 4 and 5 and the A.C. windings 6 and 7 of the pair of suitable reactors 8 and 9, respectively. As will be explained in more detail hereinafter, the saturable reactors 8 and 9, having D.C. windings 11 and 12, respectively, regulate the current flow through the primary winding 2 of the transformer in accordance with battery voltage to provide a constant charging current.

The conductor 5 includes the main charger power switch 13 and a pair of relay contacts 14 and is connected to one end terminal of the primary winding 2 of the transformer 1 through a pair of relay contacts 15 and to a tap 16 on the primary winding 2 through a pair of relay contacts 17. The tap 16 on the primary winding 2 is provided in order that the charging current may be automatically adjusted so that the charger can be utilized for both 12- and 6-volt batteries. To this end, the contacts 15 and 17 are operated by a relay 18 which, as will be explained in more detail hereinafter, is responsive to terminal voltage of the battery being charged. The relay contacts 14, connected in series in the conductor 5, are operated by a main power relay 19 which is connected across the conductors 4 and 5 by means of a pair of contacts 21 and 22 associated with a timer 23. As noted hereinbefore, the charger of the present invention is adapted to provide a constant charging current for not less than a maximum period of time and not more than a maximum period of time provided that the battery has not reached a full state of charge in the interim. The timer 23, which is connected across the conductors 4 and 5, is operative through the contacts 21 and 22 to control the energization of the power relay 19. To this end, the timer 23 is operative to open the contacts 22 at the end of the predetermined minimum charging time and to open the contacts 21 at the end of the maximum predetermined charging time. As shown, the timer contact 22 is connected in shunt across a charge condition indicating lamp 25 and the timer contact 21 is connected in shunt across a charge condition indicating lamp 26. The lamps 25 and 26 are operative to indicate which of the timer contacts has terminated battery charging. A pair of relay contacts 27 associated with a voltage sensitive relay 28 which, as will be explained in more detail hereinafter, is connected across the battery terminals, are connected in shunt across the timer contacts 22 and lamp 26 and hence are operative to energize the lamp 26 when the timer contacts 22 are open.

In considering the operation of the control circuit for the charger in the present invention, it will be understood that when the unit is energized by the closing of the main power switch 13 that the timer contacts 21 and 22 are closed, energizing the relay 19 which closes the contacts 14 to energize the main power transformer. After the minimum charging period has expired, the timer 23 operates to open the contacts 22 and the unit will stop charging if the voltage sensitive relay 28 has been energized during that period to open contacts 27. Under such conditions the lamp 26 will be lighted indicating that the battery is fully charged. If the voltage sensitive relay 28 has not opened the contacts 27 during the minimum charging period, the unit will continue to charge the battery until the relay 28 is energized. If the battery voltage does not rise to a point which will energize the relay 28, the timer 23 is operative to open the contacts 21 to terminate the charge at the expiration of the maximum charging time. If the charge is terminated by the opening of the relay contacts 27, the lamp 26 will be energized to indicate that the charge is complete. The lamp 26 will remain on until the power switch 13 is opened. If, however, the charge is terminated by the timer contact 21, the lamp 25 will be lit and remain on indicating that the battery should be tested for defects.

Considering now the rectifier section of the battery charger of the present invention and the constant current circuit therefor, it will be seen that a pair of diodes 31 and 32 are connected to the end terminals to the secondary winding 3 of the power transformer 1 from a conventional full wave rectifier circuit. The output of the rectifier circuit formed by the diodes 31 and 32 and the secondary winding 3 of the transformer 1 is adapted to be applied to the terminals of the battery to be charged by means of the conductors 33 and 34. As shown, the conductor 33 is connected to the center tap of the secondary winding 3 of the transformer 1 and the conductor 34 is connected to the anodes of the diodes 31 and 32. The conductors 33 and 34 are equipped with battery clips 35 and 36, which are adapted for contact with the terminal posts of the battery to be charged.

As noted hereinbefore, the charger of the present invention employs the saturable reactors 8 and 9 to control the current flow through the primary winding 2 of the transformer 1. A transistor 37 is utilized to control the D.C. current supplied to the control windings 11 and 12 of the saturable reactors 8 and 9 in accordance with the rectifier output voltage and the battery terminal voltage. The control windings 11 and 12 are so connected that with the saturable reactors 8 and 9 fully saturated, that is, a condition wherein maximum D.C. current flows through these windings, the power transformer will furnish a maximum output. If the saturable reactors are not saturated, the output through the power transformer will be at a minimum. As shown, the transistor 37 is a PNP junction type transistor having the usual emitter, collector, and base electrodes.

The collector electrode 38 of the transistor 37 is connected in series with the D.C. control winding 11 of the saturable reactor 8, the D.C. control winding 12 of the saturable reactor 9 and, by means of the conductor 39, to the center tap of the secondary winding 3 of the transformer 1. The emitter 41 of the transistor 37 is connected to the conductor 34 by means of a conductor 42. As shown, the base 43 of the transistor 37 is connected through adjustable resistor 44 to the junction between the resistor 45 and the Zener diode which are connected across the output of the rectifier circuit by means of the conductors 39 and 42. The base 43 of the transistor 37 is also connected through the adjustable resistor 47 having a pair of adjustable contacts 48 and 49 to the point "A" in the rectifier circuit. As shown, the contact 48 on the adjustable resistor 47 is adapted to be shunted out of the circuit through a pair of contacts 51 associated with the relay 18 which is responsive to the terminal voltage of the battery being charged. As will be explained in more detail hereinafter, the relay 18 is operative to adjust the bias to the transistor 37 through the operation of the contacts 51 to adapt the constant current circuit for either a 6- or a 12-volt battery.

In the operation of the constant current circuit utilized in the charger of the present invention, the resistor 45 and the Zener diode 46 provide an adjustable constant quiescent current to the base of the transistor 37. The resistance of the D.C. output leads from the points "A" to the points "B," which has been shown schematically as a resistor 52, sets up a back biasing voltage for the transistor 37. The adjustable resistors 44 and 47 provide a summing circuit which divides the portion of control between the quiescent current level and the back biasing voltage level developed by the current through the D.C. leads from the point "A" to point "B." This sets up a feed-back circuit between the voltage developed across the points "A" and "B" and the control current through the saturable reactors 8 and 9. For a given setting of the resistors 44 and 47, this circuit will maintain a constant current in the D.C. output leads 33 and 34 by reducing the control current in the transistor 37 and desaturating the reactors 8 and 9 if the D.C. output current tries to rise above the set point, the forward bias and the saturation of the reactors is increased to maintain the D.C. output current constant. This mode of operation is effective to maintain the D.C. output current of the charger constant if the A.C. line voltage tends to vary or the terminal voltage of the battery being charged changes during the charging period.

In order to automatically adapt the charger of the present invention to the polarity of the battery to which it is connected, a pair of relays 54 and 55 oppositely polarized by means of the diodes 56 and 57, respectively, are provided. As shown, the relays 54 and 55 and their polarizing diodes 56 and 57 are connected across the charger output leads 33 and 34. The relay 54 has associated therewith a pair of contacts 58 and 59 and the relay 55 has associated therewith a pair of contacts 61 and 62. As shown, the contacts 58 and 59 of the relay 54 and the contacts 61 and 62 of the relay 55 are connected in the charger output conductors 35 and 36 so as to provide a double pole, double throw polarity reversing switch. If the clips 35 and 36 are connected to a battery in one polarity, the relay 54 will be energized and the relay 55 will be de-energized. If the connecting clips 35 and 36 are reversed on the battery, the relay 55 will be energized and the relay 54 will remain de-energized. This automatic polarity adjusting circuit protects the charger operator and the battery being charged against a reversed polarity connection and a possibility of an arc or an explosion.

As mentioned hereinbefore, a relay 18 is provided to automatically adapt the charger of the present invention for both 6- and 12-volt batteries. To this end, the relay 18 is connected across the charger output conductors 33 and 34 by means of a resistor 63. The value of the resistor 63 is chosen such that the relay 18 will not be energized by a fully charged 6-volt battery but will be energized by a discharged 12-volt battery. The relay 18 has associated therewith the contacts 15, 17 and 51, described hereinbefore, and an additional pair of contacts 64. The contacts 64 of the relay 18 are connected in shunt across a resistor 65 which is connected in series with the relay 28 across the charger output conductors 33 and 34. As mentioned hereinbefore, the relay 28 is a voltage sensitive relay adapted to be energized when the terminal voltage battery being charged rises to a value indicating a fully charged condition. The relay 28 may be of the type described and claimed in U.S. Patent No. 2,443,968, issued June 22, 1948, to F. A. Swing. Since the relay 28 is responsive to the terminal voltage of the battery, and since the charger of the present invention is adapted for use on both 6- and 12-volt batteries, the contacts 64 connected in shunt across the resistor 65 are provided to short the resistor 65 out of circuit with the relay 28 when the battery is charging a 6-volt battery. When the charger is connected to a 12-volt battery, the relay 18 will be energized opening the contacts 64 to connect the resistor 65 in series with the relay 28. When energized, the relay 18 is also operative to close the contacts 17 and open the contacts 15 changing the energization of the transformer 1 by connecting the input lead 5 to the tap 16 on the secondary winding 2 of the transformer. In addition, when energized, the relay 18 is also operative to close the contacts 51 which shorts out the portion of the resistor 57 between the point "A" and the contacts 48 which changes the set point of the constant voltage circuit.

In considering the battery of the charger of the present invention, it will be seen that the control circuit of the charger is designed to give the battery being charged a high charge for a minimum period of time which will terminate if the battery is fully charged during that period allowing the operator to charge another battery. It also protects the battery by terminating the charge at the end of the minimum set time period if the battery is completely charged at that time. By providing a constant current charge, the charger of the present invention permits maximum number of ampere hours to be placed in a battery during a given period of time. The automatic polarity reversing circuit protects the operator of the battery against reverse polarity connections and the associated hazards. In addition, it can be seen that the charger of the present invention is adapted to automatically adjust its operation to accommodate either 6- and 12-volt batteries without relying on the operator to adjust its various set points.

What is claimed as new is:

1. A battery charger adapted for charging batteries having a first terminal voltage and for charging batteries having a second higher terminal voltage comprising, in combination, rectifier means adapted to be connected between a source of alternating current and the battery to be charged to supply a charging current to said battery, charging current regulating means connected to said rectifier means to maintain the charging current supplied to said battery constant, timing means for controlling the energization of said rectifier means from said source so as to supply a charging current to said battery for at least a predetermined minimum period of time but not longer than a predetermined maximum period of time, first voltage sensitive relay means connected to said battery and adapted to disconnect said rectifier means from said source when said battery attains a full state of charge between said predetermined minimum and maximum charging periods, and second voltage sensitive relay means connected to said battery adapted to be energized only when said charger is connected to batteries having said second higher terminal voltage, said second voltage sensitive relay means being connected when energized to change the sensitivity of said first voltage relay means, the energization of said rectifier means from said alternating current source and the charging rate of said regulating means.

2. A battery charger adapted for charging batteries having a first terminal voltage and for charging batteries having a second higher terminal voltage comprising, in combination, rectifier means adapted to be connected to the battery to be charged to supply a charging current thereto, adjustable circuit means adapted to connect said rectifier means to a source of alternating current for adjustably energizing said rectifier in accordance with the terminal voltage of the battery being charged, timing means for controlling the energization of said rectifier means so as to supply a charging current to said battery for at least a predetermined minimum period of time but not longer than a predetermined maximum period of time, first voltage sensitive relay means connected to said battery and adapted to disconnect said rectifier means from said source when said battery attains a full state of charge between said predetermined minimum and maximum charging periods of time, charging current regulating means connected to said rectifier means to maintain the charging current supplied to said battery constant, second voltage sensitive relay means connected to said battery and adapted to be energized only when said charger is connected to batteries having said second higher terminal voltage, said second voltage sensitive relay means being connected when energized to change the sensitivity of said first voltage sensitive relay means, the energization of said rectifier means from said alternating current source and the charging rate of said regulating means to adapt said charger to charge a battery having said higher terminal voltage.

3. A battery charger adapted for charging batteries having a first terminal voltage and for charging batteries having a second higher terminal voltage comprising, in combination, rectifier means adapted to be connected to the battery to be charged to supply a charging current thereto, circuit means adapted to connect said rectifier means to a source of alternating current, said circuit means being adjustable for the energization of said rectifier in accordance with the terminal voltage of the battery being charged, timing means energized from said alternating current source for controlling the energization of said rectifier means so as to supply a charging current to said battery for at least a predetermined minimum period of time but not longer than a predetermined maximum period of time, first voltage sensitive relay means connected to said battery and adapted to disconnect said rectifier means from said source when said battery attains a full state of charge between said predetermined minimum and maximum periods of time, battery condition indicating means connected across the said alternating current source and activated by said timer means and said first voltage sensitive relay means to indicate battery condition upon the interruption of charging, charging current regulating means connected to said rectifier means to maintain the charging current supplied to said battery constant, second sensitive relay means connected to said battery and adapted to be energized only when said charger is connected to batteries having said second higher terminal voltage, said second voltage sensitive relay means being connected when energized to change the sensitivity of said first voltage relay means, the energization of said rectifier means from said alternating current source and the charging rate of said regulating means to adapt said charger to charge a battery having said second higher terminal voltage.

References Cited by the Examiner
UNITED STATES PATENTS

| | | | |
|---|---|---|---|
| 1,208,044 | 12/16 | Suren | 320—38 |
| 2,540,174 | 2/51 | Riley et al. | 320—48 |
| 2,978,633 | 4/61 | Medlar. | |
| 2,987,663 | 6/61 | Medlar. | |

LLOYD McCOLLUM, *Primary Examiner.*

MILTON O. HIRSHFIELD, *Examiner.*